US008588299B1

(12) United States Patent
Yeo et al.

(10) Patent No.: US 8,588,299 B1
(45) Date of Patent: Nov. 19, 2013

(54) DECODING VIDEO DATA (75) Inventors: Chuohao Yeo, Berkeley, CA (US); Wai-Tian Tan, Sunnyvale, CA (US); Debargha Mukherjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1310 days.

(21) Appl. No.: 12/363,644

(22) Filed: Jan. 30, 2009

(51) Int. Cl.
*H04N 7/12* (2006.01)
*H04N 7/173* (2011.01)
*H04N 7/50* (2006.01)

(52) U.S. Cl.
CPC . *H04N 7/50* (2013.01); *H04N 7/173* (2013.01)
USPC ......................... 375/240.12; 725/90

(58) Field of Classification Search
CPC .............................. H04N 7/50; H04N 7/17318
USPC ................ 386/230, 314; 725/90; 375/240.12, 375/240.27; 709/231
See application file for complete search history.

(56) References Cited

U.S. PATENT DOCUMENTS

| 5,477,397 | A | * | 12/1995 | Naimpally et al. | 386/230 |
| 5,589,993 | A | * | 12/1996 | Naimpally | 386/314 |
| 7,200,858 | B1 | * | 4/2007 | Benjamin et al. | 725/90 |
| 7,930,419 | B2 | * | 4/2011 | Mullig et al. | 709/231 |
| 2006/0188025 | A1 | * | 8/2006 | Hannuksela | 375/240.27 |
| 2008/0247463 | A1 | * | 10/2008 | Buttimer et al. | 375/240.12 |

* cited by examiner

*Primary Examiner* — Gims Philippe (57) ABSTRACT

Decoding video data. At least one video stream including a first plurality of frames encoded at a first resolution and a second plurality of frames encoded at a second resolution are received, wherein the second plurality of frames encoded at the second resolution directly correspond to at least a subset of the first plurality of frames encoded at the first resolution, and wherein the first resolution is greater than the second resolution. The video stream is decoded based on at least one received frame of the first plurality of frames encoded at the first resolution and at least one received frame of the second plurality of frames encoded at the second resolution.

19 Claims, 6 Drawing Sheets

```
Receive at least one video stream comprising a first plurality of frames encoded at
a first resolution and a second plurality of frames encoded at a second resolution,
wherein the second plurality of frames encoded at the second resolution directly
correspond to at least a subset of the first plurality of frames encoded at the first
resolution, and wherein the first resolution is greater than the second resolution
510
```

↓

```
Decode the video stream based on a set of received frames of the first plurality of
frames encoded at the first resolution and a set of received frames of the second
plurality of frames encoded at the second resolution
520
```

↓

```
Transmit a positive acknowledgement in response to
receiving a frame of the first plurality of frames
530
```

↓

```
Compare the first frame with at least one second frame encoded at the second
resolution that corresponds to the first frame in response to identifying a missing
portion of a first frame encoded at the first resolution
540
```

```
Perform an error estimation between at least one portion of the first frame
and a collocated portion of the second frame
542
```

↓

```
Determine whether the error estimation satisfies a threshold indicating
consistency between the first frame and the second frame
544
```

DECODING VIDEO DATA

FIELD

Various embodiments of the present invention relate to the field of streaming media.

BACKGROUND

In video communications, there can be many types of losses, such as isolated packet losses or losses of complete or multiple frames. Breakups and freezes in video presentation are often caused by a system's inability to quickly recover from such losses. In a typical system where the video encoding rate is continuously adjusted to avoid sustained congestion, losses tend to appear as short bursts that span between one packet and two complete frames.

Current error concealment schemes exist that attempt to address this concern. However, current error concealment schemes are ineffective in various ways. For example, current error concealment schemes typically rely on the existence of intact pixels near the region to be concealed, making them ineffective against burst loss that span a complete frame or more. Moreover, current error concealment decisions are typically based on guesses, since the true likeness of the lost region is unknown. This means the concealment effort can sometimes inadvertently introduce larger errors

BRIEF DESCRIPTION OF THE DRAWINGS

The accompanying drawings, which are incorporated in and form a part of this specification, illustrate embodiments of the present invention.

The drawings referred to in the description of embodiments should not be understood as being drawn to scale except if specifically noted.

DESCRIPTION OF EMBODIMENTS

Various embodiments of the present invention, decoding video data, are described herein. In one embodiment, a method for decoding video data is described. At least one video stream including a first plurality of frames encoded at a first resolution and a second plurality of frames encoded at a second resolution are received, wherein the second plurality of frames encoded at the second resolution directly correspond to at least a subset of the first plurality of frames encoded at the first resolution, and wherein the first resolution is greater than the second resolution. The video stream is decoded based on at least one received frame of the first plurality of frames encoded at the first resolution and at least one received frame of the second plurality of frames encoded at the second resolution. In one embodiment, the video stream is decoded based on a set of received frames of the first plurality of frames encoded at the first resolution and a set of received frames of the second plurality of frames encoded at the second resolution In another embodiment of the present invention, a method for encoding video data is described. The video data is encoded at a first resolution into a first video stream comprising a first plurality of frames. A positive receipt acknowledgement for at least a subset of the first plurality of frames is received. The first video stream is encoded at a second resolution into a second video stream comprising a second plurality of frames, wherein frames of the second video stream are encoded using positively acknowledged frames of the first video stream, and wherein the first resolution is greater than the second resolution.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

For purposes of clarity and brevity, the instant description of embodiments and examples will specifically deal with video data. Embodiments of the present invention, however, are not limited solely to use with video data. Instead, the embodiments of the present invention are well suited to use with audio-based data, image-based data, web page-based data, graphic data and the like. Specifically, the embodiments of the present invention are directed towards any data transmitted over a manner that might incur transmission losses. Embodiments of the present invention provide for encoding and decoding, e.g., transforming, the video data to detect and conceal transmission errors.

Embodiments of the present invention employ an additional and independent lower resolution video stream, also referred to herein as a preview stream or thumbnail stream, to detect and conceal transmission errors in a full resolution video stream. For compression efficiency, the full resolution video stream normally predicts from any past pictures and is restricted to predict from a positively acknowledged picture only when loss is detected. In various embodiments, the low resolution stream always predicts from a positively acknowledged frame. The use of positively acknowledged frame for predictive encoding of the lower resolution video stream ensures that every received low resolution frame can be properly decoded. Furthermore, when at least a portion of the full resolution video stream is lost, the lower resolution frame serves as high confidence basis of what the lost portion resembles and can substantially enhance the effectiveness of receiver error concealment. It should be appreciated that even if a sequence of full resolution frames are lost together with their corresponding lower resolution frames, the reception of a proximate lower resolution frame is sufficient to reconstruct a likeness of its corresponding full resolution frame, and can be immediately employed for concealment using previously received full resolution frames.

Figure 1:
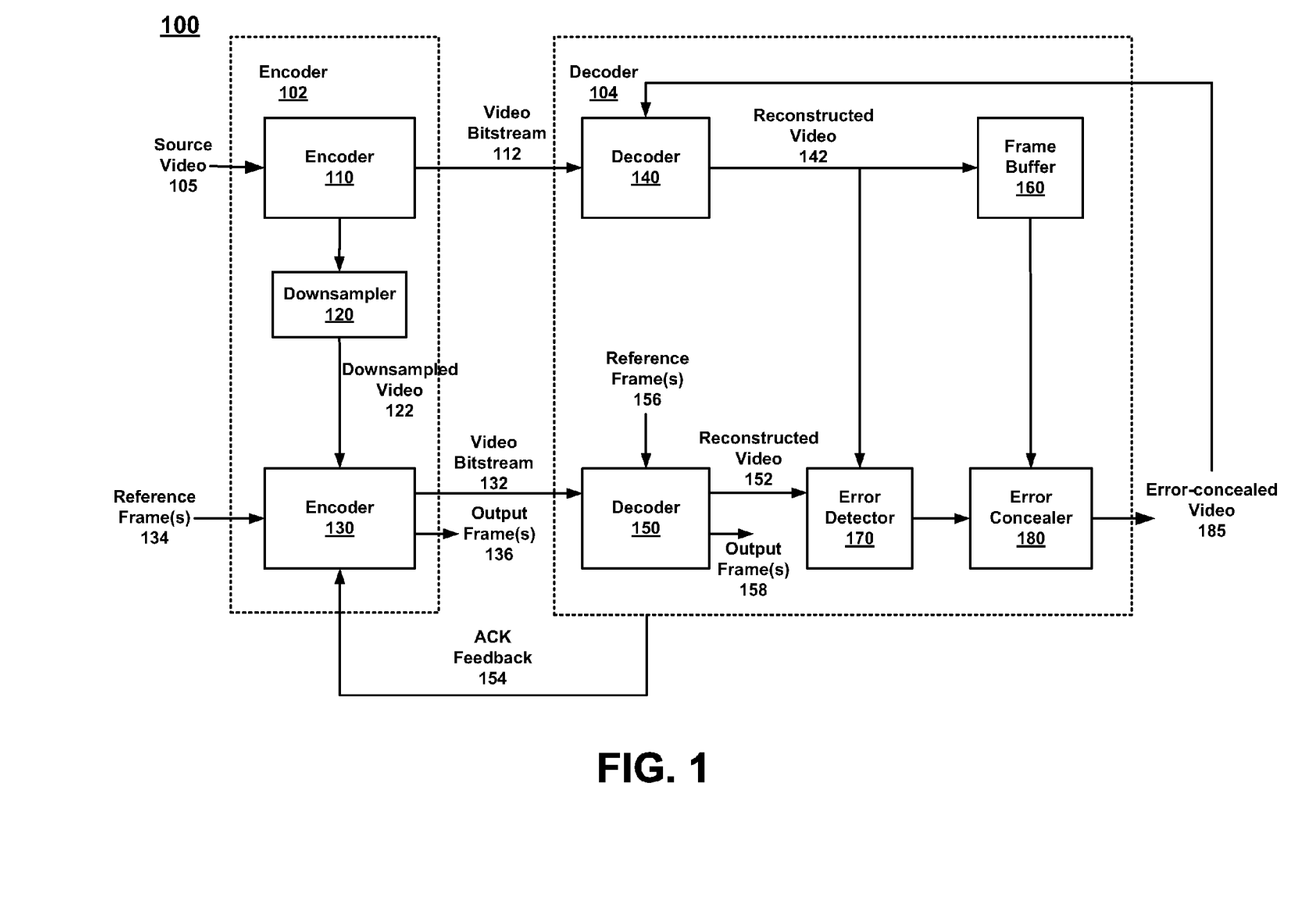
FIG. 1 illustrates a block diagram of a system for encoding and decoding video data, in accordance with one embodiment of the present invention.

FIG. 1 is a block diagram of a system 100 for encoding and decoding video data, in accordance with one embodiment of the present invention. System 100 includes encoder 102 and decoder 104. It should be appreciated that encoder 102 and decoder 104 are implemented within separate computer systems. In various embodiments, encoder 102 and decoder 104 are communicatively coupled over a network (not shown), e.g., a local area network (LAN), and intranet, the Internet, or other type of communication network. It should be appreciated that artifact encoder 102 and decoder 104 can be implemented as hardware, firmware, software and hardware, software and firmware, or hardware, software and firmware. Moreover, it should be appreciated that system 100 may include additional components that are not shown so as to not unnecessarily obscure aspects of the embodiments of the present invention.

In one embodiment, encoder 102 includes encoder 110, downsampler 120 and encoder 130 for encoding source video 105 at different resolutions. For example, in one embodiment, encoder 102 is configured to receive source video 105 and to encode source video 105 into video bitstream 112. Downsampler 120 is configured to downsample the output of encoder 102, generating downsampled video 122. It should be appreciated that downsampled video 122 can be downsampled by any factor, resulting in downsampled video 122 having a lower resolution than video bitstream 112, e.g., a frame of downsampled video 122 has fewer pixels than a frame of video bitstream 112. In one embodiment, downsampled video 122 also includes fewer frames than video bitstream 122, e.g., downsampled video 122 has a lower frame rate than video bitstream 112. In one embodiment, downsample 120 downsamples the input video data by a factor of four in each dimension, yielding downsampled video 122 having a bit overhead of one-sixteenth the bit overhead of video bitstream 112.

Encoder 130 receives downsampled video 122 and encodes downsampled video 122 into video bitstream 132. In one embodiment, encoder 130 is configured to encode video bitstream 132 such that frames of bitstream 132 are predicted only from frames that have been positively acknowledged by a receiver, e.g., decoder 10, as acknowledgement (ACK) feedback 154. By predicting from frames that are positively acknowledged as recited, the present embodiment ensures that every received frame of video bitstream 132 is decodable. For example, at decoder 104, the frames of video bitstream 132 can be used for concealment of lost portions of a frame, and for controlling subsequent error propagation.

In various embodiments, encoder 130 utilizes reference frame(s) 134 to perform encoding. A reference frame 134 can be selected from a previous output frame 136 or a previous target frame of downsampled video 122. It should be appreciated that the previous target frame of downsampled video is available as reference frame 134 because target frame 122 is a degraded version of reconstructed video 142.

Figure 2:
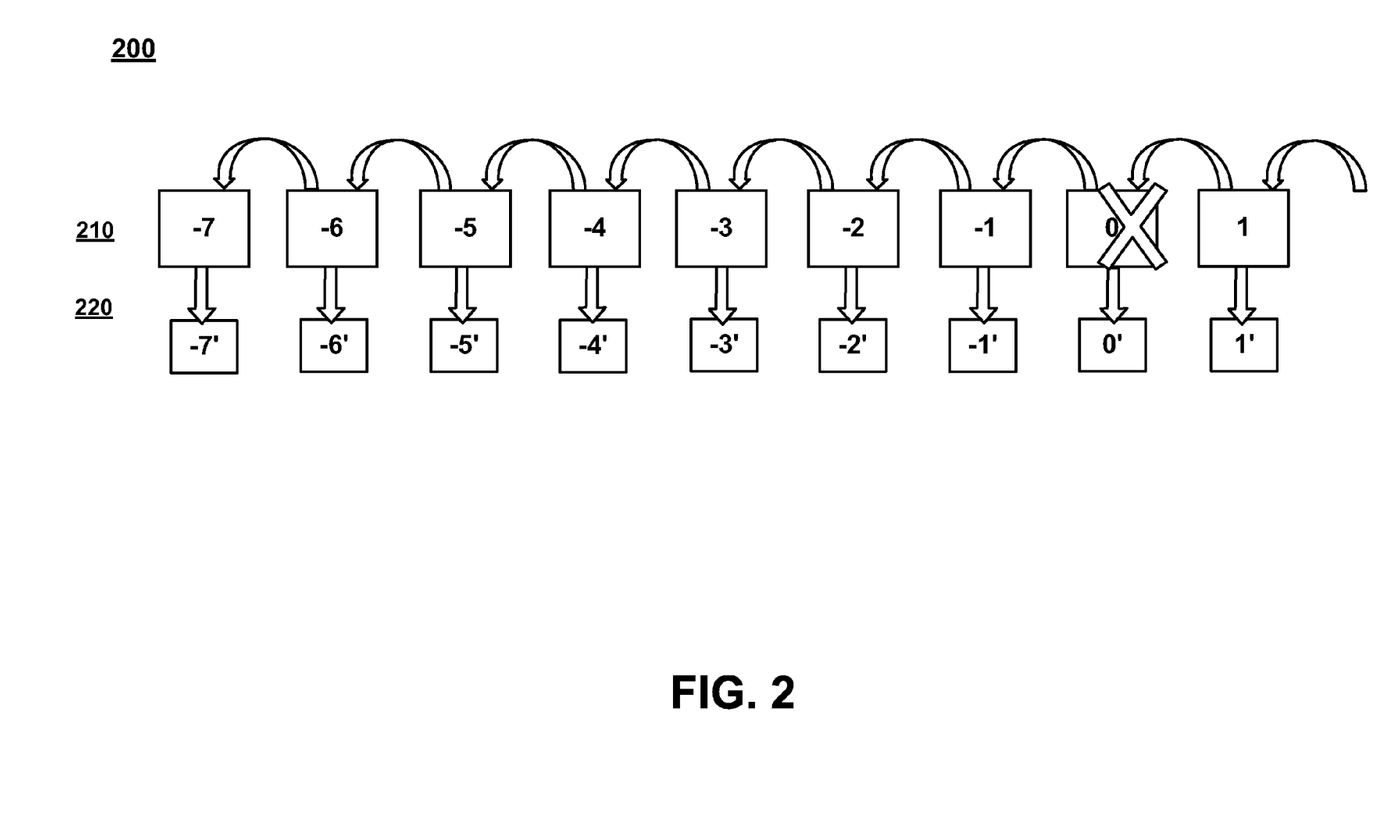
FIG. 2 illustrates example frames of a full resolution stream and a preview stream, in accordance with one embodiment of the present invention.

FIG. 2 illustrates example frames 200 of a full resolution stream 210 and a preview stream 220, e.g., a lower resolution stream, in accordance with one embodiment of the present invention. Frames of preview stream 220 are predicted only from positively acknowledged frames from the receiver, e.g., decoder 104 of FIG. 1.

For instance, full resolution stream 210 and preview stream 220 are transmitted to a receiver. Predictive frames of full resolution stream 210 are encoded in accordance with the coding standard. For example, predictive frames of full resolution stream 210 can be dependent on frames that are not positively acknowledged by the receiver.

In one embodiment, the preview stream encoder, e.g., encoder 130, receives a positive acknowledgement 154 that a frame of full resolution stream 210 has been fully received. The preview stream encoder encodes predictive frames using positively acknowledged frames of full resolution stream 210. Accordingly, preview stream 220 provides for effective error detection and error concealment.

For example, frames −7, −7', −6, −6', −5, −5', −4, −4', −3, −3', −2, −2', −1 and −1' have been transmitted to a receiver. At the time that frame −0' is being encoded for transmission to the receiver, only full resolution frames −7 and −6 have been positively acknowledged. In the instant example, where frame −0' is a predictive frame, it is predictively encoded using at least one of frames −7 and −6. It should be appreciated that a full resolution frame and its corresponding preview frame, e.g., frames 0 and 0', are transmitted for contemporaneous receipt and decoding, and that while full resolution frame and preview frame may predictively rely on different frames, they are transmitted for receipt for contemporaneous decoding.

With reference to FIG. 1, it should be appreciated that encoder 110 and encoder 130 of encoder 102 illustrate an example embodiment. In other embodiments, encoder 102 may include any number of encoders, and that the present embodiment illustrated in FIG. 1 is shown for ease of explanation. For example, encoder 102 may use the same encoder for encoding video bitstream 112 and video bitstream 132. Accordingly, any encoder that is configured to encode data into multiple video bitstreams having different resolutions may be used. Also, it should be appreciated that video encoder 102 can implement any video encoding standard, including, but not limited to: H.261, H.263, H.264, MPEG-1, MPEG-2, MPEG-4 and other video encoding standards.

Encoder 102 is configured to transmit video bitstream 112 and video bitstream 132 to decoder 104. Decoder 104 includes decoder 140, decoder 150, frame buffer 160, error detector 170 and error concealer 180. Decoder 140 is configured to receive and decode video bitstream 112 into reconstructed video 142. As presented herein, reconstructed video 142 is also referred to as a full resolution video. Frames of reconstructed video 142 are stored in frame buffer 160. It should be appreciated that any number of frames can be stored in frame buffer 160, and is dependent on the capacity of frame buffer 160 and the size of the individual frames.

Decoder 150 is configured to receive and decode video bitstream 132 into reconstructed video 152. As presented herein, reconstructed video 152 is also referred to as a lower resolution video, a preview video, or a thumbnail video. In particular, reconstructed video 152 is a lower resolution representation of reconstructed video 142. In one embodiment, reconstructed video 152 is based on video bitstream 132 that was predictably encoded from frames that were positively acknowledged by decoder 104. Therefore, frames of reconstructed video 152 are each decodable.

In various embodiments, decoder 150 utilizes reference frame(s) 156 to perform decoding. A reference frame 156 can be selected from a previous output frame 158 or a downsampled frame of reconstructed video 142. It should be appreciated that a downsampled frame of reconstructed video 142 is the same as a frame of downsampled video 122 when there is no loss.

In one embodiment, error detector 170 is configured to determine whether a frame of reconstructed video 142 includes an error. In one embodiment, after a transmission error occurs, error detector 170 compares a lower resolution frame of reconstructed video 152 and the corresponding full resolution frame of reconstructed video 142 to localize blocks which are not consistent with the lower resolution frame. In one embodiment, blocks of pixels of the full resolution frame are downsampled to the resolution of the lower resolution frame, and the downsampled blocks of the full resolution frame are compared to the collocated blocks of pixels of the lower resolution frame. In one embodiment, a mean square error (MSE) is calculated between the downsampled blocks of the full resolution frame and the collocated blocks of pixels of the lower resolution frame.

For example, in one embodiment, the lower resolution frame and the corresponding full resolution frame are compared by examining each non-overlapping 16×16 block of pixels in the reconstructed frame, and computing the mean square error (MSE) between its down-sampled 4×4 block of pixels and the collocated block in the preview frame.

Figure 3:
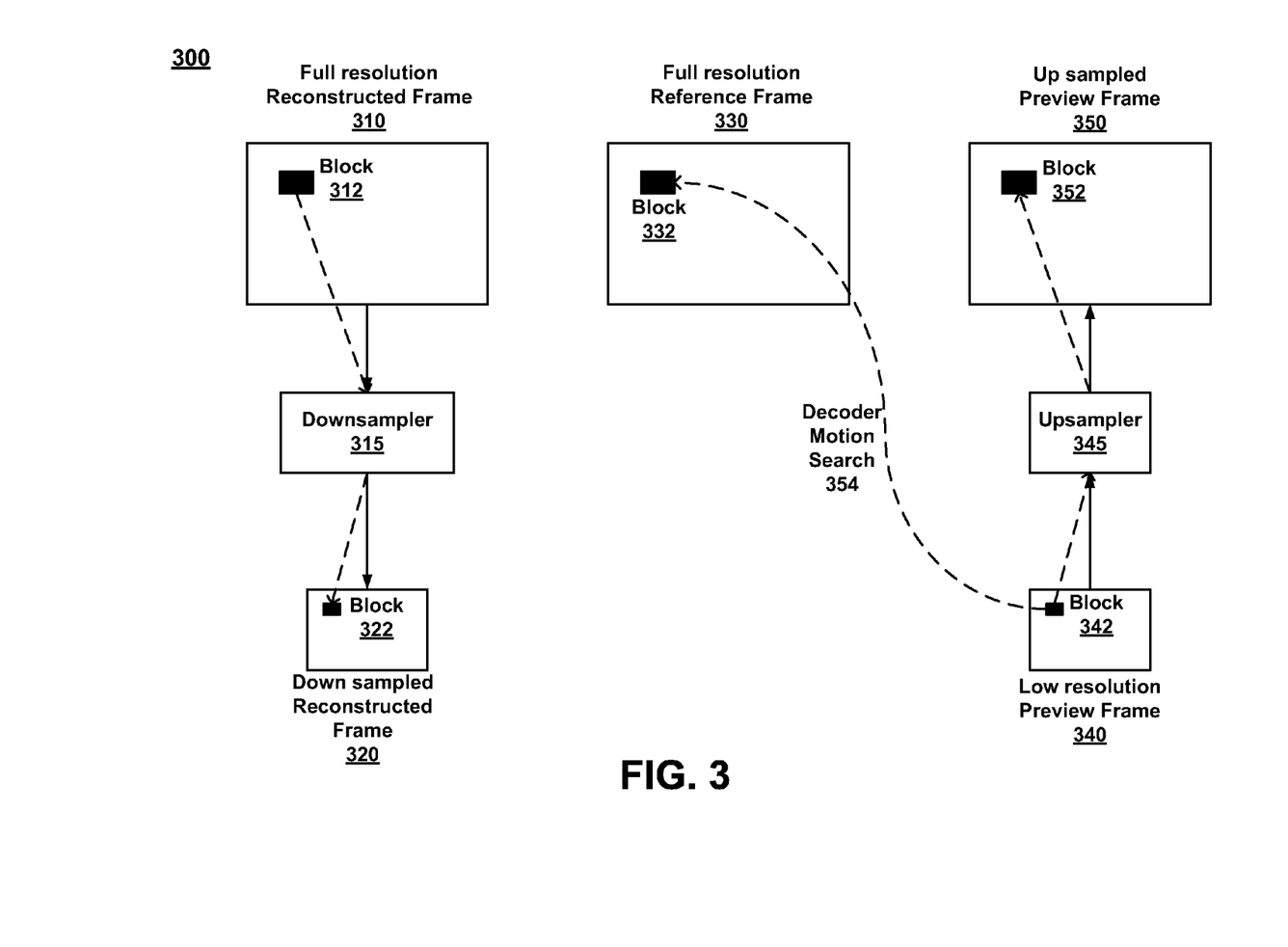
FIG. 3 illustrates an example error detection and concealment in a full resolution video frame using a preview frame, in accordance with one embodiment of the present invention.

FIG. 3 illustrates an example error detection and concealment 300 in a full resolution video frame using a preview frame, in accordance with one embodiment of the present invention. As shown in FIG. 3, full-resolution reconstructed frame 310 is downsampled at downsampler 315 to generate down-sampled reconstructed frame 320. It should be appreciated that down-sampled reconstructed frame 320 is downsampled to have the same resolution as low resolution preview frame 340.

For example, for block 312, the MSE between block 322 and 342 is computed. In one embodiment, a threshold is then applied to determine if the full resolution block 312 is consistent with the preview block 342. In one embodiment, the threshold is computed from past correctly received full resolution frames and preview frames to adapt to both preview reconstruction quality and video content.

With reference to FIG. 1, in various embodiments, error detector 170 is used for controlling error propagation. The lower resolution frames of reconstructed video 152 provide for the detection and correction of propagated concealment errors that grow large through normal decoding. Any block in reconstructed video 142 with a detected discrepancy from the lower resolution frame that satisfies the threshold can be corrected using concealment, e.g., at error concealer 180.

With reference to FIG. 2, when at least a portion of full resolution stream 210 is lost, e.g., frame 0, frame 0' serves as a high confidence basis of what frame 0 resembles and can substantially enhance the effectiveness of receiver error concealment. Similarly, even if frames −2, −1, and 0 are lost together with their previews, the reception of the preview frame 1' for frame 1 is sufficient to reconstruct a likeness of frame 1, and can be immediately employed for concealment using the previously received frame −3.

With reference to FIG. 1, error concealer 180 is configured to conceal detected error in a full resolution frame of reconstructed based at least in part on comparing the full resolution frame with its corresponding lower resolution frame. In one embodiment, error concealer 180 replaces the missing portion of the full resolution frame with a collocated portion of the lower resolution frame. In another embodiment, error concealer 180 utilizes at least a portion of the lower resolution frame that is collocated to the missing portion of the full resolution frame as a descriptor in performing a motion search on a downsampled version of at least one prior full resolution frame. The missing portion is then replaced with a portion of a prior full resolution frame. In another embodiment, error concealer 180 replaces the missing portion of the full resolution frame by merging a collocated portion of the lower resolution frame with a selected portion of a prior full resolution frame.

With reference to FIG. 3, in accordance with one embodiment, if full resolution block 312 is found to be inconsistent with preview block 342, preview block 342 is used as a descriptor to perform decoder motion search 354 in at least one smoothed full resolution reference frame. For purposes of the instant description of embodiment, smoothing refers to the removal of high frequency information from a frame. In other words, smoothing effectively downsamples a frame. For example, a reference frame is smoothed with the same antialiasing filter used in downsampler 315 to avoid inadvertent inclusion of high spatial frequency during subsequent decoder motion search 354.

In various embodiments, a full resolution reference frame is a previously received and reconstructed full resolution frame. In one embodiment, the reference frames are error free frames. However, it should be appreciated that in other embodiments, the full resolution reference frame may itself include error concealed portions, and that it can be any full resolution frame of reconstructed video. However, it is noted that buffer size might restrict the number of potential reference frames, and that typically the closer the reference frame is to the frame currently under error concealment, the better the results of motion search 354.

In one embodiment, the predictor block with the smallest MSE, e.g., block 332 in, is one candidate for error concealment. For example, consider where block 332 is the best match found by decoder motion search 354. In one embodiment, low resolution preview frame 340 is upsampled at upsampler 345 to generate up-sampled preview frame 350. It should be appreciated that up-sampled preview frame 350 is downsampled to have the same resolution as full resolution reconstructed frame 310. In one embodiment, a choice is then made between block 332 and the up-sampled block 352 for the concealment. In one embodiment, if the smallest MSE is too high, then upsampled block 352 is selected for error concealment. In one embodiment, if the smallest MSE is not too high, then block 332 is selected for error concealment. In another embodiment, block 332 and upsampled block 352 are merged for concealment. The final error concealed frame is placed in the reference frame buffer of the full resolution decoder, e.g., decoder 140 of FIG. 1, for subsequent decoding.

Figure 4:
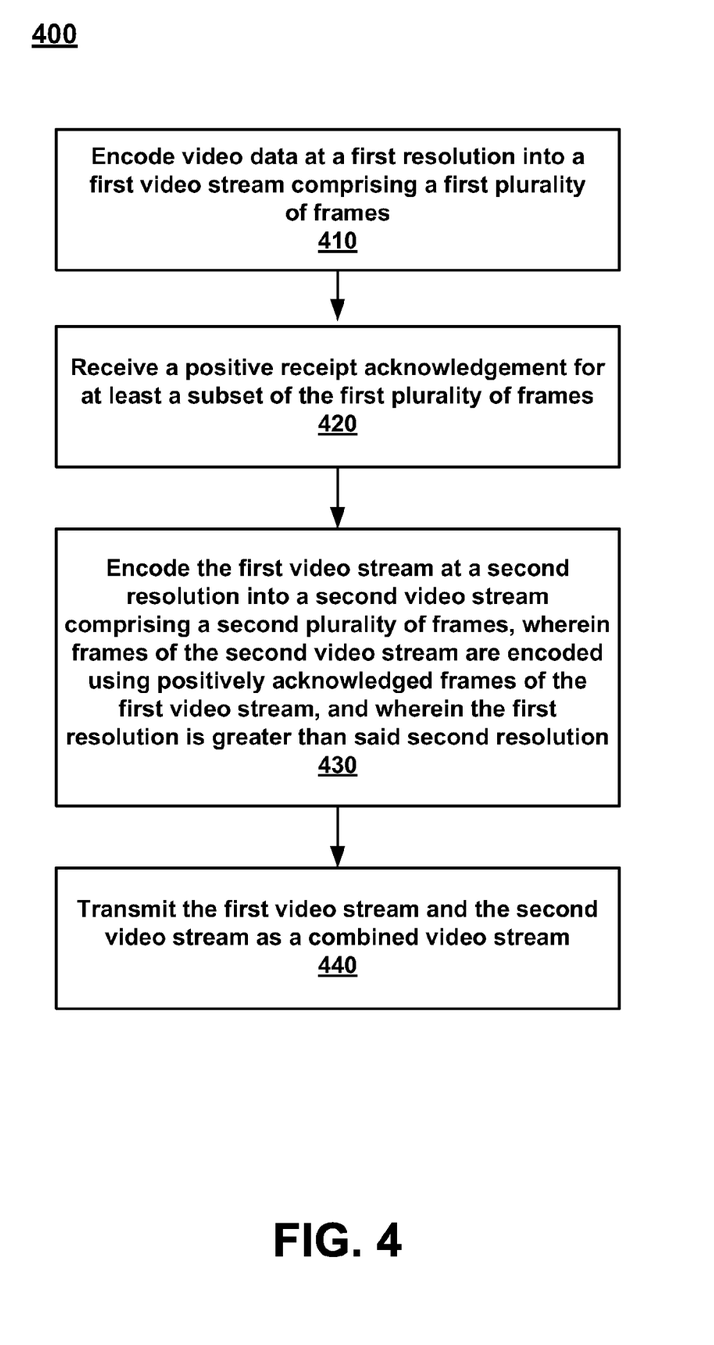
FIG. 4 illustrates a flowchart illustrating a process for encoding video data, in accordance with one embodiment of the present invention.

FIG. 4 is a flowchart illustrating a process 400 for encoding video data, in accordance with one embodiment of the present invention. In one embodiment, process 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 400 is performed by encoder 102 of FIG. 1.

At block 410 of process 400, video data is encoded at a first resolution, e.g., full resolution, into a first video stream including a first plurality of frames.

At block 420, a positive receipt acknowledgement is received for at least a subset of the first plurality of frames.

At block 430, the first video stream is encoded at a second resolution, e.g., lower resolution, into a second video stream including a second plurality of frames. Frames of the second video stream are encoded using the positively acknowledged frames of the first video stream. The first resolution is greater than the second resolution. In one embodiment, the second resolution is downsampled by a factor of four in each dimension relative to the first resolution. In one embodiment, at least a subset of the second plurality of frames is predictively encoded based on the positively acknowledged frames of the first plurality of frames.

In one embodiment, as shown at block 440, the first video stream and the second video stream are transmitted as a combined video stream. It should be appreciated that in other embodiments, the first video stream and the second video stream can be transmitted separately.

It should be appreciated that blocks 410 and 430 are performed for a full resolution frame and a corresponding lower resolution frame at substantially the same time. For example, encoder 102 of FIG. 1 performs the full resolution encoding and the corresponding lower resolution encoding for a frame at the same or overlapping times.

Figure 5A:
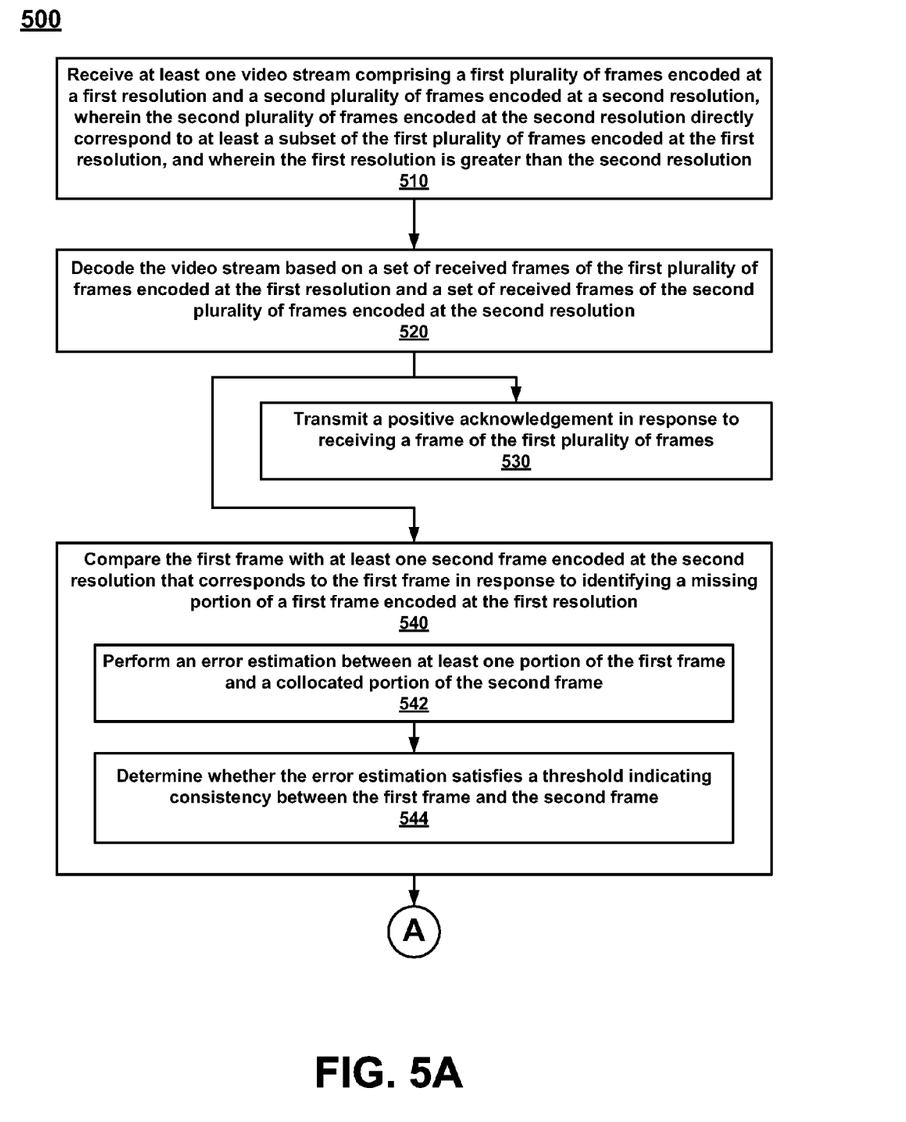
FIGS. 5A and 5B illustrate a flowchart illustrating a process for decoding video data, in accordance with one embodiment of the present invention.
Figure 5B:
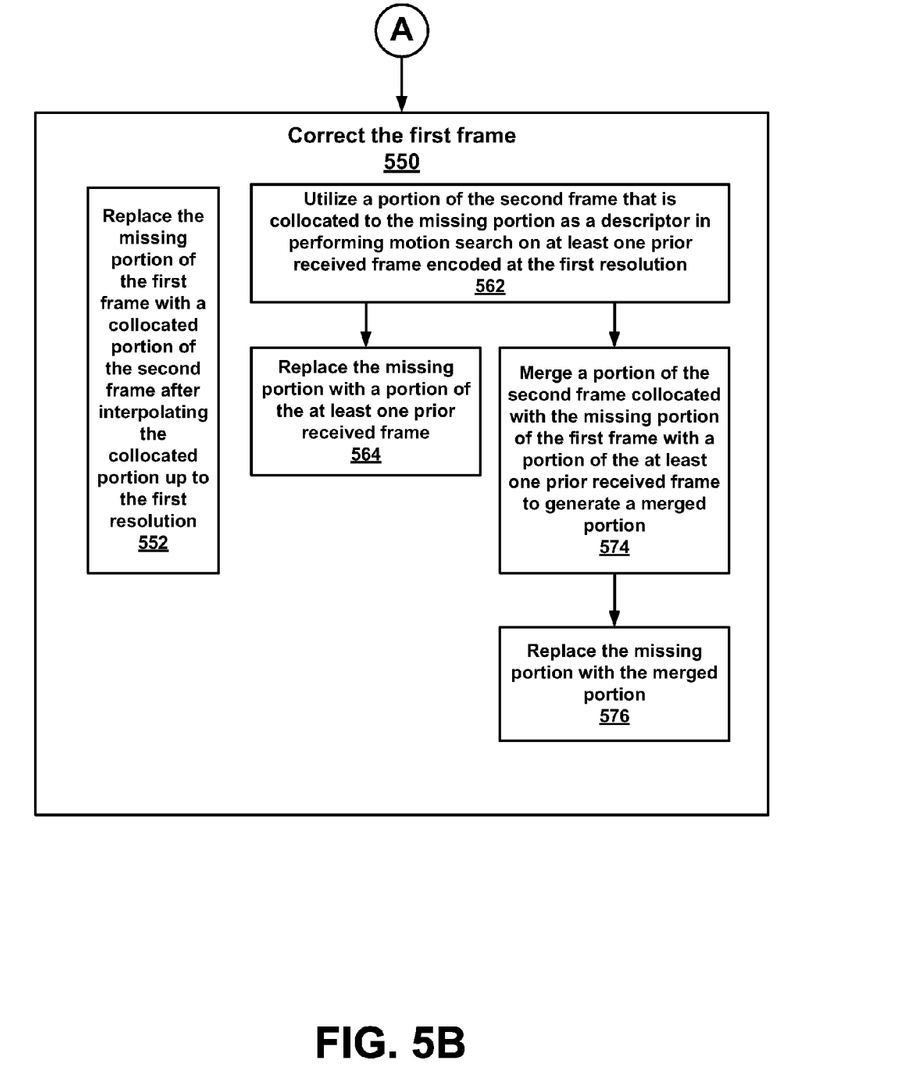

FIGS. 5A and 5B are a flowchart illustrating a process 500 for decoding video data, in accordance with one embodiment of the present invention. In one embodiment, process 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, process 500 is performed by decoder 104 of FIG. 1.

With reference to FIG. 5A, at block 510 of process 500, at least one video stream including a first plurality of frames encoded at a first resolution and a second plurality of frames encoded at a second resolution is received, in which the second plurality of frames encoded at the second resolution directly correspond to at least a subset of the first plurality of frames encoded at the first resolution. The first resolution is greater than the second resolution. In one embodiment, the second plurality of frames is predictively encoded based on positively acknowledged frames of the first plurality of frames. In one embodiment, the at least one video stream includes a first video stream including the first plurality of frames encoded at the first resolution and a second video stream including the second plurality of frames encoded at the second resolution.

At block 520, the video stream is decoded based on at least one received frame of the first plurality of frames encoded at the first resolution and at least one received frame of the second plurality of frames encoded at the second resolution. In one embodiment, the video stream is decoded based on a set of received frames of the first plurality of frames encoded at the first resolution and a set of received frames of the second plurality of frames encoded at the second resolution. In one embodiment, the at least one received frame of the first plurality of frames and he at least one received frame of the second plurality of frames are the most recently received frames of the first plurality of frames and the second plurality of frames, respectively.

In one embodiment, as shown at block 530, a positive acknowledgement is transmitted in response to receiving a frame of the first plurality of frames.

In one embodiment, as shown at block 540, in response to identifying a missing portion of a first frame encoded at the first resolution, the first frame is compared with at least one second frame encoded at the second resolution that corresponds to the first frame. In one embodiment, as shown at block 542, error estimation between at least one portion of the first frame and a collocated portion of the second frame is performed. In one embodiment, the error estimation is between at least one downsampled portion of the first frame and a collocated portion of the second frame is performed. At block 544, a determination is made whether the error estimation satisfies a threshold indicating consistency between the first frame and the second frame.

With reference to FIG. 5B, in one embodiment, as shown at block 550, the first frame is corrected based at least in part on the comparing the first frame with the second frame. In one embodiment, as shown at block 552, the missing portion of the first frame is replaced with a collocated portion of the second frame, after the collocated portion is interpolated up to the first resolution. In another embodiment, as shown at block 562, a portion of the second frame that is collocated to the missing portion is utilized as a descriptor in performing motion search on at least one prior received frame encoded at the first resolution. In one embodiment, the motion search is performed on a downsampled version of at least one prior received frame encoded at the first resolution. At block 564, the missing portion is replaced with a portion of the at least one prior received frame. In another embodiment, as shown at block 574, a portion of the second frame collocated with the missing portion of the first frame is merged with a portion of the at least one prior received frame to generate a merged portion. It should be appreciated that the merging is performed at the first resolution. At block 576, the missing portion is replaced with the merged portion.

Embodiments of the present invention provide for error detection and correction in low-latency video communications over best-effort networks by employing an additional lower resolution and robustly coded copy of the source video. Embodiments of the present invention incur can be combined with previously decoded frames to achieve effective concealment of isolated and burst losses even under tight delay constraints with a proportionately small increase to rate overhead.

Various embodiments of the present invention, encoding video data and decoding video data, are thus described. While the present invention has been described in particular embodiments, it should be appreciated that the present invention should not be construed as limited by such embodiments, but rather construed according to the following claims.

What is claimed is:

1. A computer-implemented method for decoding video data, said method comprising:
receiving at least one video stream comprising a first plurality of frames encoded at a first resolution and a second plurality of frames encoded at a second resolution, wherein said second plurality of frames encoded at said second resolution directly correspond to at least a subset of said first plurality of frames encoded at said first resolution, wherein said first resolution is greater than said second resolution and wherein said second plurality of frames is predictively encoded based on positively acknowledged frames of said first plurality of frames due to a positive acknowledgement that said positively acknowledged frames were received; and
decoding said video stream based on at least one received frame of said first plurality of frames encoded at said first resolution and at least one received frame of said second plurality of frames encoded at said second resolution.

2. The computer-implemented method of claim 1 wherein said at least one video stream comprises a first video stream comprising said first plurality of frames encoded at said first resolution and a second video stream comprising said second plurality of frames encoded at said second resolution.

3. The computer-implemented method of claim 1 further comprising:
transmitting said positive acknowledgement in response to receiving a frame of said first plurality of frames.

4. The computer-implemented method of claim 1 wherein said decoding said video stream comprises:
   in response to identifying a missing portion of a first frame encoded at said first resolution, comparing said first frame with at least one second frame encoded at said second resolution that corresponds to said first frame.

5. The computer-implemented method of claim 4 wherein said comparing said first frame with said second frame comprises:
   performing an error estimation between at least one portion of said first frame and a collocated portion of said second frame; and
   determining whether said error estimation satisfies a threshold indicating consistency between said first frame and said second frame.

6. The computer-implemented method of claim 4 further comprising:
   correcting said first frame based at least in part on said comparing said first frame with said second frame.

7. The computer-implemented method of claim 6 wherein said correcting said first frame comprises:
   replacing said missing portion of said first frame with a collocated portion of said second frame after interpolating said collocated portion up to said first resolution.

8. The computer-implemented method of claim 6 wherein said correcting said first frame comprises:
   utilizing a portion of said second frame that is collocated to said missing portion as a descriptor in performing motion search on at least one prior received frame encoded at said first resolution; and
   replacing said missing portion with a portion of said at least one prior received frame.

9. The computer-implemented method of claim 6 wherein said correcting said first frame comprises:
   utilizing a portion of said second frame that is collocated to said missing portion as a descriptor in performing motion search on at least one prior received frame encoded at said first resolution;
   merging a portion of said second frame collocated with said missing portion of said first frame with a portion of said at least one prior received frame to generate a merged portion; and
   replacing said missing portion with said merged portion.

10. A computer-implemented method for encoding video data, said method comprising:
   encoding said video data at a first resolution into a first video stream comprising a first plurality of frames;
   receiving a positive receipt acknowledgement for at least a subset of said first plurality of frames, wherein the subset includes positively acknowledged frames; and
   encoding said first video stream at a second resolution into a second video stream comprising a second plurality of frames, wherein frames of said second video stream are encoded using positively acknowledged frames of said first video stream, and wherein said first resolution is greater than said second resolution.

11. The computer-implemented method of claim 10 further comprising:
   transmitting said first video stream and said second video stream as a combined video stream.

12. The computer-implemented method of claim 10 wherein said second plurality of frames are predictively encoded based on said positively acknowledged frames of said first plurality of frames.

13. The computer-implemented method of claim 10 wherein a reference frame used in said encoding said first video stream at said second resolution into said second video stream comprising said second plurality of frames is selected from a list consisting essentially of:
   a previous output frame of said second video stream; and
   a previous frame of a downsampled version of said first video stream.

14. A computer-readable storage medium for storing instructions that when executed by one or more processors perform a method for decoding video data, said method comprising:
   receiving at least one video stream comprising a first plurality of frames encoded at a first resolution and a second plurality of frames encoded at a second resolution, wherein said second plurality of frames encoded at said second resolution directly correspond to at least a subset of said first plurality of frames encoded at said first resolution, wherein said second plurality of frames is predictively encoded based on positively acknowledged frames of said first plurality of frames due to a first positive acknowledgement that said positively acknowledged frames were received, and wherein said first resolution is greater than said second resolution;
   decoding said video stream based on at least one received frame of said first plurality of frames encoded at said first resolution and at least one received frame of said second plurality of frames encoded at said second resolution, wherein said decoding said video stream comprises;
   transmitting a second positive acknowledgement in response to receiving a frame of said first plurality of frames; and
   in response to identifying a missing portion of a first frame of said first plurality of frames encoded at said first resolution, comparing said first frame with at least one second frame of said second plurality of frames encoded at said second resolution that corresponds to said first frame.

15. The computer-readable storage medium of claim 14 wherein said comparing said first frame with said second frame comprises:
   performing an error estimation between at least one portion of said first frame and a collocated portion of said second frame; and
   determining whether said error estimation satisfies a threshold indicating consistency between said first frame and said second frame.

16. The computer-readable storage medium of claim 14 wherein said method further comprises:
   correcting said first frame based at least in part on said comparing said first frame with said second frame.

17. The computer-readable storage medium of claim 16 wherein said correcting said first frame comprises:
   replacing said missing portion of said first frame with a collocated portion of said second frame.

18. The computer-readable storage medium of claim 16 wherein said correcting said first frame comprises:
   utilizing a portion of said second frame that is collocated to said missing portion as a descriptor in performing motion search on at least one prior received frame encoded at said first resolution; and
   replacing said missing portion with a portion of said at least one prior received frame.

19. The computer-readable storage medium of claim 16 wherein said correcting said first frame comprises:
   utilizing a portion of said second frame that is collocated to said missing portion as a descriptor in performing motion search on at least one prior received frame encoded at said first resolution;

merging a portion of said second frame collocated with said missing portion of said first frame with a portion of said at least one prior received frame to generate a merged portion; and replacing said missing portion with said merged portion.

* * * * *